United States Patent [19]
Nobuchi

[11] Patent Number: 6,067,224
[45] Date of Patent: May 23, 2000

[54] PORTABLE INFORMATION PROCESSING APPARATUS WITH AN IMPROVED ACOUSTIC EFFECT

[75] Inventor: Atsunobu Nobuchi, Kawasaki, Japan

[73] Assignee: Fujitsu Limited, Kawasaki, Japan

[21] Appl. No.: 09/048,095

[22] Filed: Mar. 26, 1998

[30] Foreign Application Priority Data

Oct. 3, 1997 [JP] Japan ..................................... 9-271096

[51] Int. Cl.[7] ........................................................ G06F 1/16
[52] U.S. Cl. ............................ 361/683; 361/680; 381/87; 381/88
[58] Field of Search ..................... 361/683, 680; 364/708.1; 381/87, 88

[56] References Cited

U.S. PATENT DOCUMENTS

| 5,588,063 | 12/1996 | Edgar . | |
|---|---|---|---|
| 5,838,537 | 11/1998 | Lundgren et al. | 361/683 |

FOREIGN PATENT DOCUMENTS

| 0 635 777 | 1/1995 | European Pat. Off. . |
| 55-55401 | 4/1980 | Japan . |
| 4-617 | 1/1992 | Japan . |
| 5-324124 | 12/1993 | Japan . |
| 6-35489 | 2/1994 | Japan . |
| 8-76884 | 3/1996 | Japan . |
| 8-171477 | 7/1996 | Japan . |
| 9-6475 | 1/1997 | Japan . |
| 9-81271 | 3/1997 | Japan . |
| 9-120354 | 5/1997 | Japan . |

*Primary Examiner*—Leo P. Picard
*Assistant Examiner*—John Reed
*Attorney, Agent, or Firm*—Staas & Halsey, LLP

[57] ABSTRACT

A portable information processing apparatus includes a body having an opening at a top wall thereof, a display unit mounted for pivotal motion on the body, a speaker mounted in an upwardly directed condition in the body below the opening, and a plurality of baffles mounted in the opening for pivotal motion between a first position in which the baffles substantially close up the opening and a second position in which the baffles are inclined by a predetermined angle with respect to the top wall of the body. The portable information processing apparatus further includes a guide member mounted for movement between an advanced position and a retracted position, and a motion conversion mechanism for converting linear motion of the guide member into pivotal motion of the baffles. When the display unit is closed, then the guide member is moved to the retracted position and the baffles are pivoted to the first position in which they substantially close up the opening. When the display unit is opened, then the guide member is moved to the advanced position by the biasing force of a coil spring, whereupon the baffles are pivoted to the second position wherein they are inclined by the predetermined angle with respect to the top wall of the body.

18 Claims, 8 Drawing Sheets

PORTABLE INFORMATION PROCESSING APPARATUS WITH AN IMPROVED ACOUSTIC EFFECT

BACKGROUND OF THE INVENTION

1. Field of the Invention

This invention relates to a portable information processing apparatus such as a notebook personal computer having an improved acoustic effect.

2. Description of the Related Art

In information processing apparatus such as computers in recent years, functions which allow processing of images and sound called multimedia, data communication and so forth, are installed also in portable information processing apparatus. In such a situation, in regard to sound, a notebook personal computer which is a kind of conventional portable information processing apparatus has developed from a type which includes, as in an old apparatus in which a speaker began to be installed, a buzzer or a like element which merely generates beep or warning sound to another type which is equipped with an acoustic apparatus which outputs sound of high quality such as stereo sound using a CD for music, a CD-ROM or a like medium as a sound source while it is successively equipped with higher functions.

Figure 1:
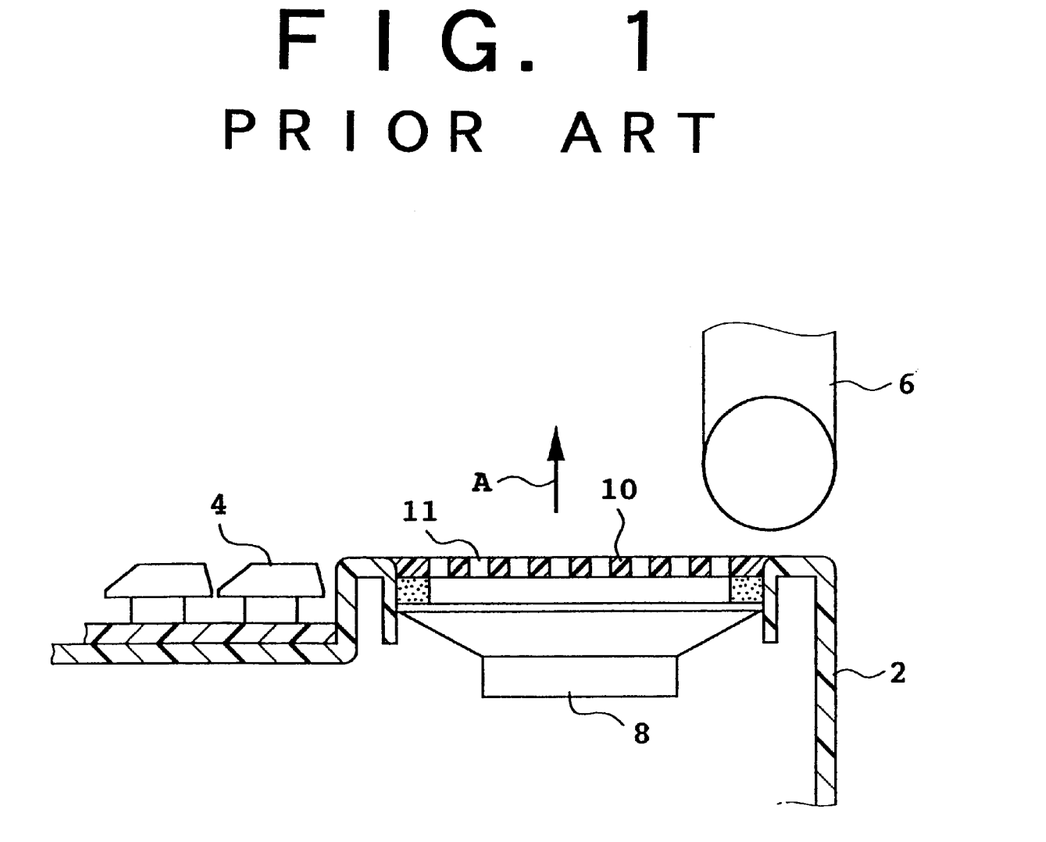
FIG. 1 is a sectional view showing a speaker mounting structure of a prior art.

However, since portability and reduction in weight are required for a portable information processing apparatus, a speaker built in a portable information processing apparatus is designed to fall within a range of restrictions. In a conventional notebook personal computer, a speaker of a small size is mounted in an upwardly directed condition in a body of the notebook personal computer as seen in FIG. 1. Referring to FIG. 1, reference numeral 2 denotes a body of a notebook personal computer having a keyboard 4, and a display unit 6 is mounted for pivotal motion on the body 2. A speaker 8 is mounted in an upwardly directed condition in the body 2, and an opening formed in a front wall of the speaker 8 is closed up with a cover 10 which has a plurality of holes 11.

Since a notebook personal computer has a small speaker mounting space, a higher acoustic effect must be obtained with a speaker of a small size. However, where a speaker of a small size is mounted in an upwardly directed condition in a body as in the conventional notebook personal computer described above, high-pitched sound which has a high directivity is released upwardly. Thus, the conventional notebook personal computer has a problem in that an operator of the personal computer listens to sound from which high-pitched sound has been removed.

Japanese Patent Laid-Open Application No. Heisei 8-171477 discloses a construction wherein a speaker is mounted in a horizontally laid condition in a body and is used in an uprightly erected condition when necessary. However, mounting of the speaker for pivotal motion on the body gives rise to a problem in handling of a cable connected to the speaker. Further, since the speaker is small in size and low in weight, the possibility is high that vibrations of the body may occur when great sound is produced from the speaker or sound produced has a resonance frequency.

SUMMARY OF THE INVENTION

Accordingly, it is an object of the present invention to provide a portable information processing apparatus which prevents removal of high-pitched sound with a simple construction and exhibits an improved acoustic effect.

In accordance with an aspect of the present invention, there is provided a portable information processing apparatus, comprising a body having an opening at a top wall thereof, a display unit mounted for pivotal motion on the body, a speaker mounted in an upwardly directed condition in the body below the opening, a baffle mounted in the opening for pivotal motion between a first position in which the baffle substantially closes up the opening and a second position in which the baffle is inclined by a predetermined angle with respect to the top wall of the body, a guide member mounted for movement between an advanced position and a retracted position in the body, biasing means for biasing the guide member to the advanced position, a first engaging projection secured to the display unit for engaging, when the display unit is closed on the body, with the guide member to move the guide member to the retracted position against a biasing force of the biasing means, and motion conversion means for converting linear motion of the guide member into pivotal motion of the baffle to move the baffle to the first position when the guide member is moved to the retracted position but move the baffle to the second position when the guide member is moved to the advanced position.

Preferably, the motion conversion means includes a flange secured to the baffle and having an elongated hole therein, and a pin secured to the guide member and inserted in the elongated hole. Alternatively, the motion conversion means may include a rack secured to the guide member, and a pinion secured to the baffle and held in meshing engagement with the rack.

When the display unit is opened (erected uprightly), the first engaging projection is spaced away from the guide member, and consequently, the guide member is moved to the advanced position by the biasing means. Consequently, the baffle is pivoted to the second position in which it is inclined by the predetermined angle with respect to the top face of the body. As a result, since sound from the speaker is reflected toward an operator by the baffle, high-pitched sound components are not removed from the sound, and consequently, the operator can listen to sound of high sound quality.

In accordance with another aspect of the present invention, there is provided a portable information processing apparatus, comprising a body having an opening at a top wall thereof, a display unit mounted for pivotal motion on the body, a speaker mounted in an upwardly directed condition in the body below the opening, a plurality of baffles mounted in the opening for pivotal motion between a first position in which the baffles substantially close up the opening and a second position in which the baffles are inclined by a predetermined angle with respect to the top wall of the body, and a plurality of biasing means for individually normally biasing the baffles toward the respective second positions, the baffles being pivoted, when the display unit is closed on the body, to the respective first positions against biasing forces of the biasing means.

The above and other objects, features and advantages of the present invention and the manner of realizing them will become more apparent, and the invention itself will best be understood, from a study of the following description and appended claims with reference to the attached drawings showing some preferred embodiments of the invention.

DESCRIPTION OF THE PREFERRED EMBODIMENTS

Figure 2:
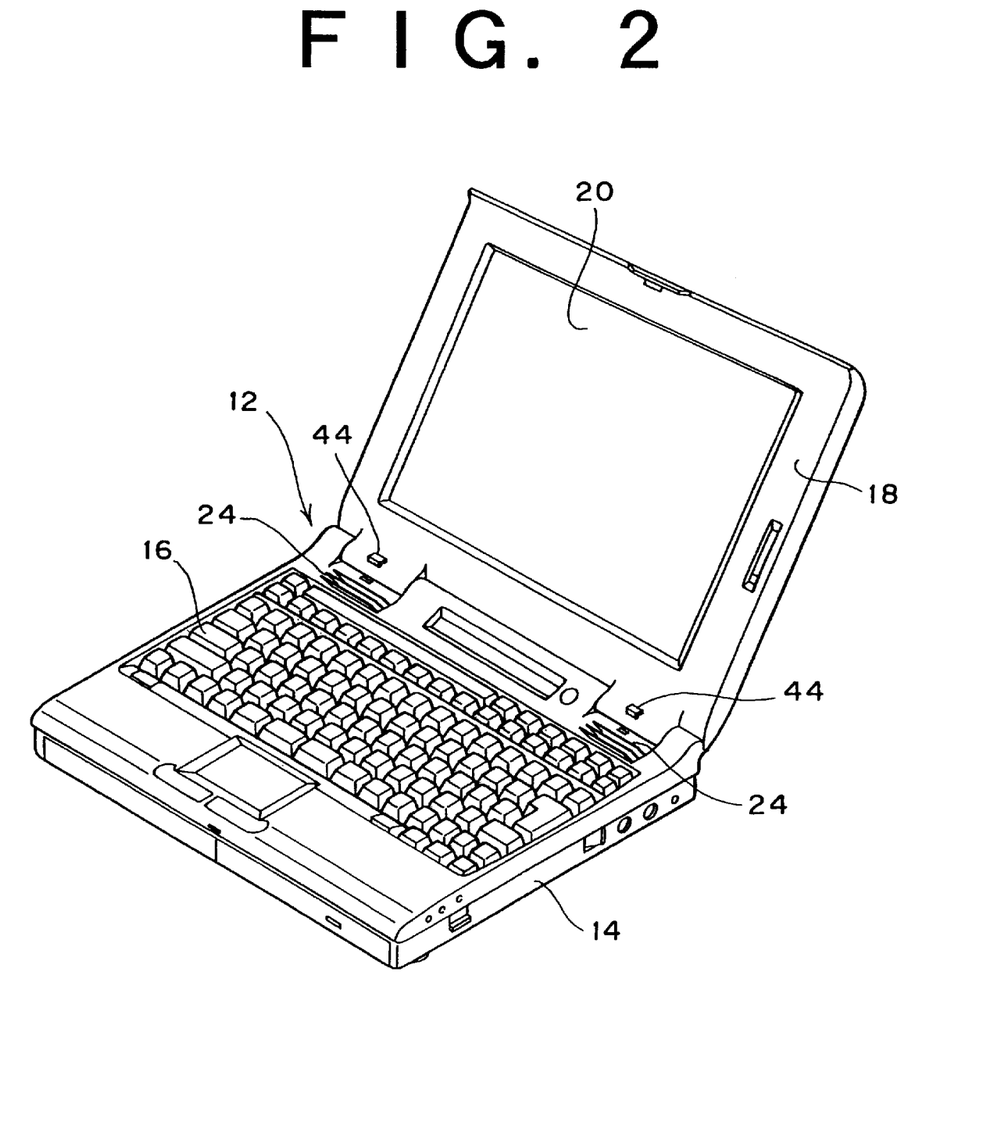
FIG. 2 is a schematic perspective view of a notebook personal computer according to an embodiment of the present invention.

Referring to FIG. 2, there is shown a schematic perspective view of a notebook personal computer 12 according to an embodiment of the present invention. The notebook personal computer 12 includes a body 14 having a keyboard 16, and a display unit 18 mounted for pivotal motion on the body 14. A liquid crystal display (LCD) 20 is carried on the display unit 18. A pair of speakers 8 are mounted in an upwardly directed condition in the body 14 of the notebook personal computer 12 (See FIG. 5). Further, a pair of openings 22 are formed in an upper wall of the body 14 in an opposing relationship to the speakers 8, and a plurality of baffles 24 are mounted for pivotal motion in each of the openings 22.

Figure 3:
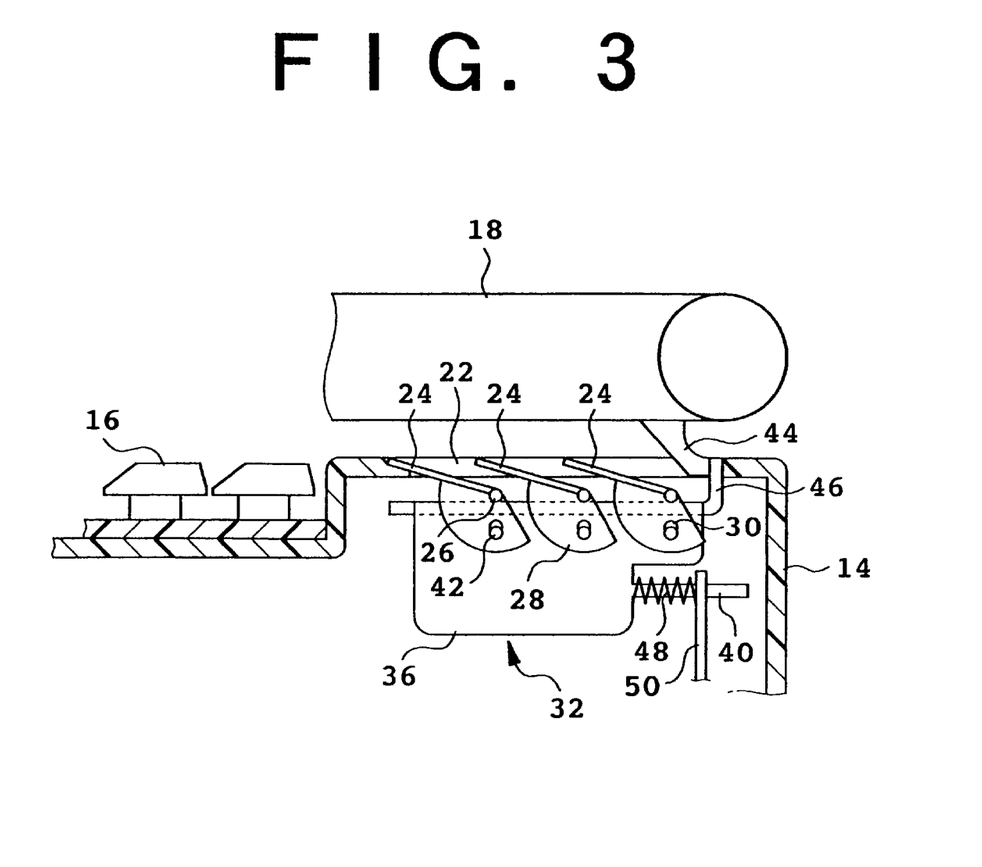
FIG. 3 is a sectional view of a first embodiment of the present invention in a condition wherein a display unit is closed.
Figure 4:
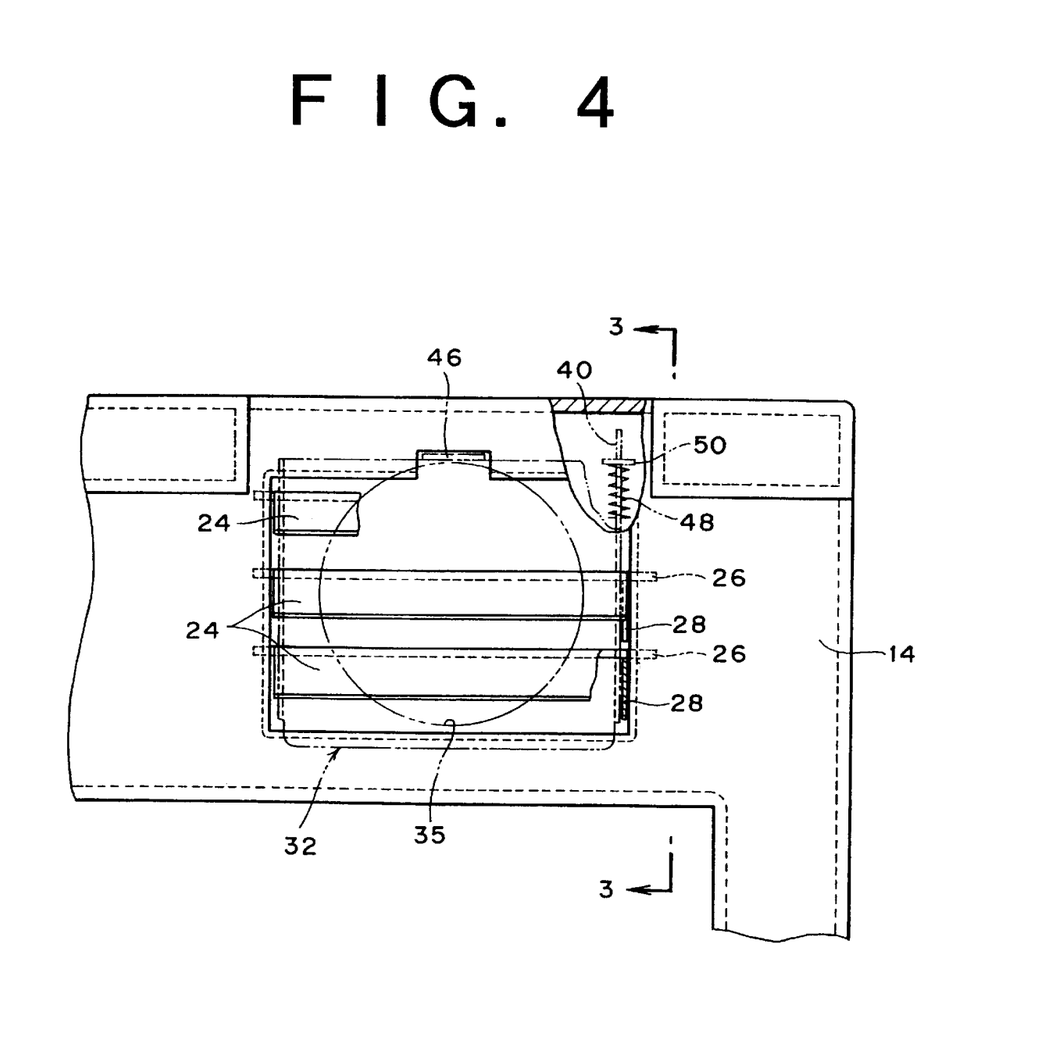
FIG. 4 is a plan view of the first embodiment.
Figure 5:
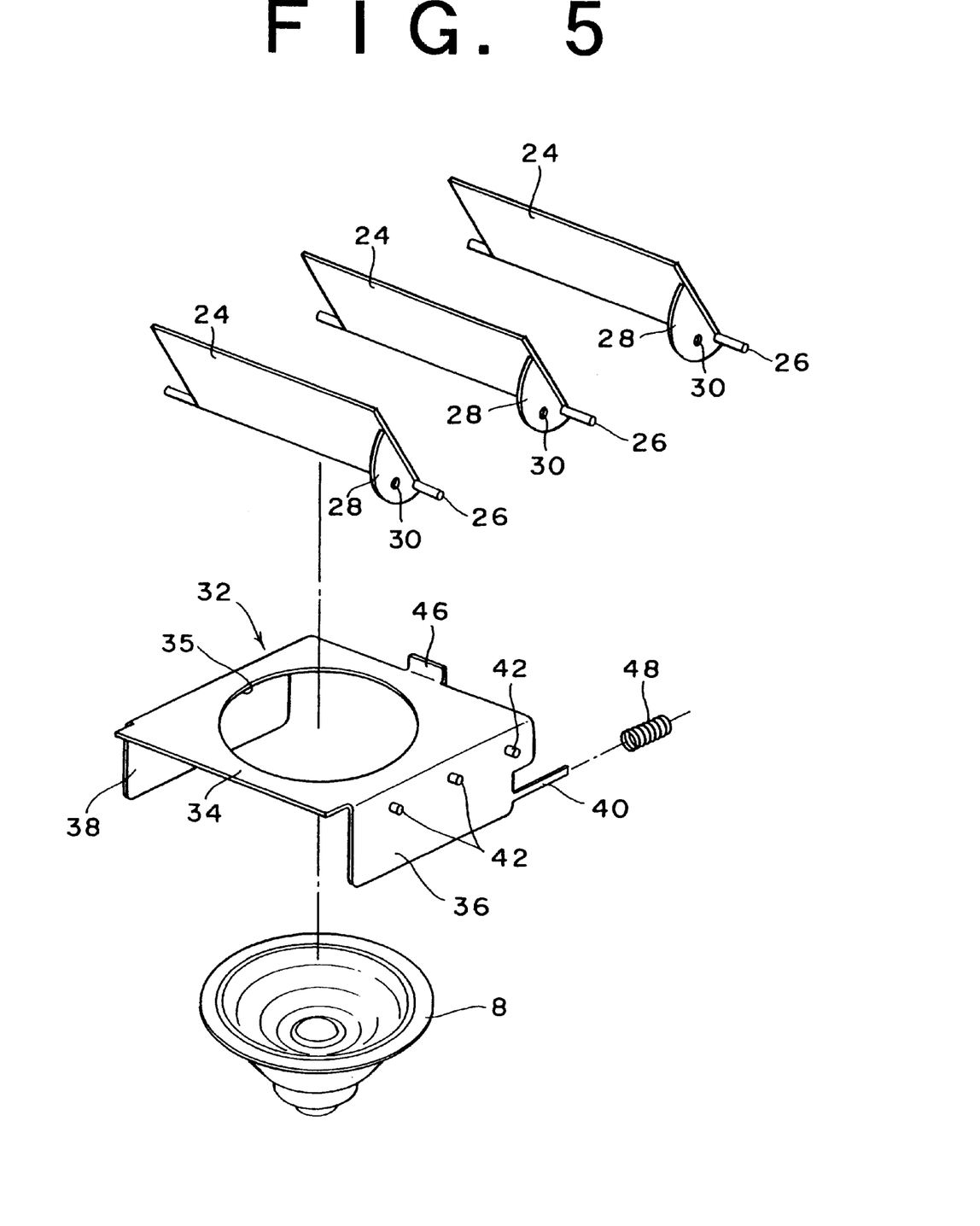
FIG. 5 is an exploded perspective view of the first embodiment.

Referring to FIGS. 3 to 5, each of the baffles or fins 24 is fixed to a shaft 26, which is supported for rotation by supporting means such as a bearing not shown. A bracket 28 is secured to the baffle 24 and has an elongated hole 30 formed therein. Each of the baffles 24 is mounted for pivotal motion between a first position in which it substantially closes a corresponding one of the openings 22 shown in FIG. 3 and a second position in which it is inclined by a predetermined angle with respect to the top face of the body shown in FIG. 6. The predetermined angle may be substantially 40 to 60 degrees and further preferably within the range of substantially 45 to 60 degrees.

As best seen in FIG. 5, below the baffles 24 in each one of the openings 22, a guide member 32 is mounted for sliding movement along a guide rail not shown. The guide member 32 has an upper plate 34 having a hole 35 therein, and a pair of side plates 36 and 38 bent substantially perpendicularly to the upper plate 34. An extension 40 is integrally formed on the side plate 36, and a plurality of pins 42 are secured to the side plate 36. The pins 42 are individually inserted in the elongated holes 30 of the baffles 24. A coil spring 48 is fitted on the extension 40 between a holding member 50 secured to the body 14 and the guide member 32.

As seen in FIG. 2, the display unit 18 has a pair of first engaging projections 44 integrally formed thereon. Meanwhile, the guide member 32 has a second engaging projection 46 integrally formed thereon for engaging, when the display unit 18 is closed on the body 14 as seen in FIG. 3, with a corresponding one of the first engaging projections 44 to move the guide member 32 to its retracted position.

Figure 6:
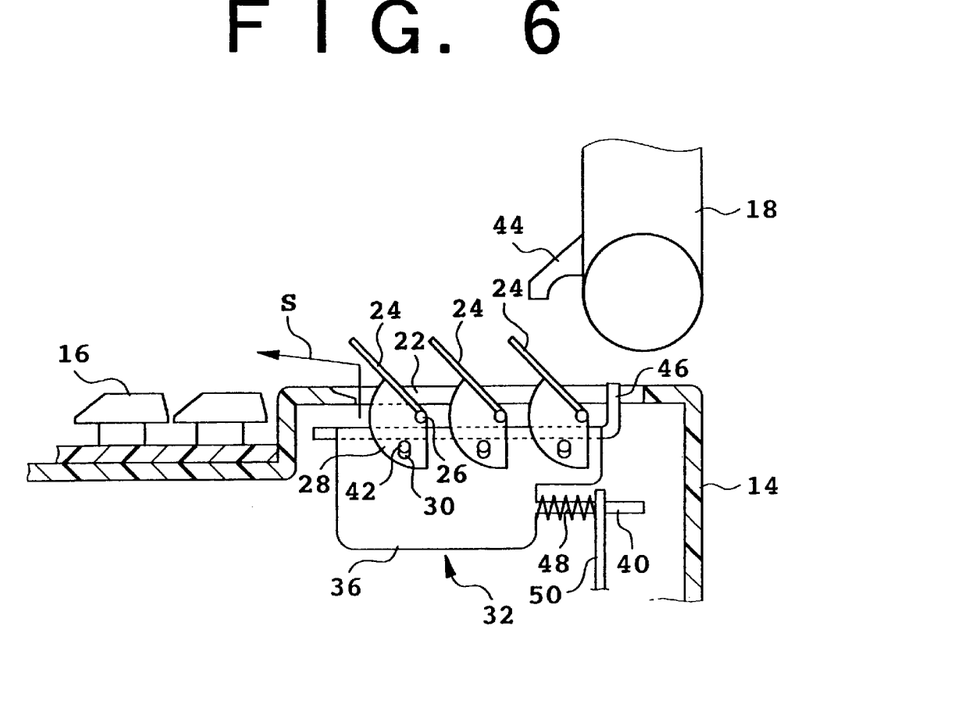
FIG. 6 is a sectional view of the first embodiment in a condition wherein the display unit is open.

The guide member 32 is mounted for movement between an advanced position shown in FIG. 6 and the retracted position shown in FIG. 3. Normally, the guide member 32 is held at its advanced position shown in FIG. 6 by a biasing force of the coil spring 48, and when the display unit 18 is closed on the body 14, then the corresponding first engaging projection 44 is engaged with the second engaging projection 46 to move the guide member 32 to the retracted position shown in FIG. 3 against the biasing force of the coil spring 48.

In the condition shown in FIG. 3 wherein the display unit 18 is closed on the body 14, the first engaging projections 44 of the display unit 18 are engaged with the second engaging projections 46 of the guide members 32. Consequently, the guide member 32 is moved to its retracted position against the biasing force of the coil spring 48, and the corresponding baffles 24 are pivoted to their first position in which they substantially close up the corresponding opening 22. Since the baffles 24 can be folded to a compact condition in this manner, they do not interfere with the display unit 18 which is closed on the body 14.

In the condition wherein the display unit 18 is open from the body 14 as seen in FIG. 6, since the engagement between the first engaging projections 44 and the second engaging projections 46 is lost, the guide member 32 is moved to its advanced position by the biasing force of the coil spring 48. Consequently, the baffles 24 are pivoted in the clockwise direction to the second position in which they are inclined approximately by 45 degrees with respect to the top face of the body 14. In this state, sound from the speaker 8 built in the body 14 is reflected toward an operator of the notebook personal computer 12 by the baffles 24 as indicated by an arrow S in FIG. 6. Particularly, high-pitched sound, which has a high directivity is reflected toward the operator by the baffles 24, allowing the operator to listen to sound of high quality.

Figure 7:
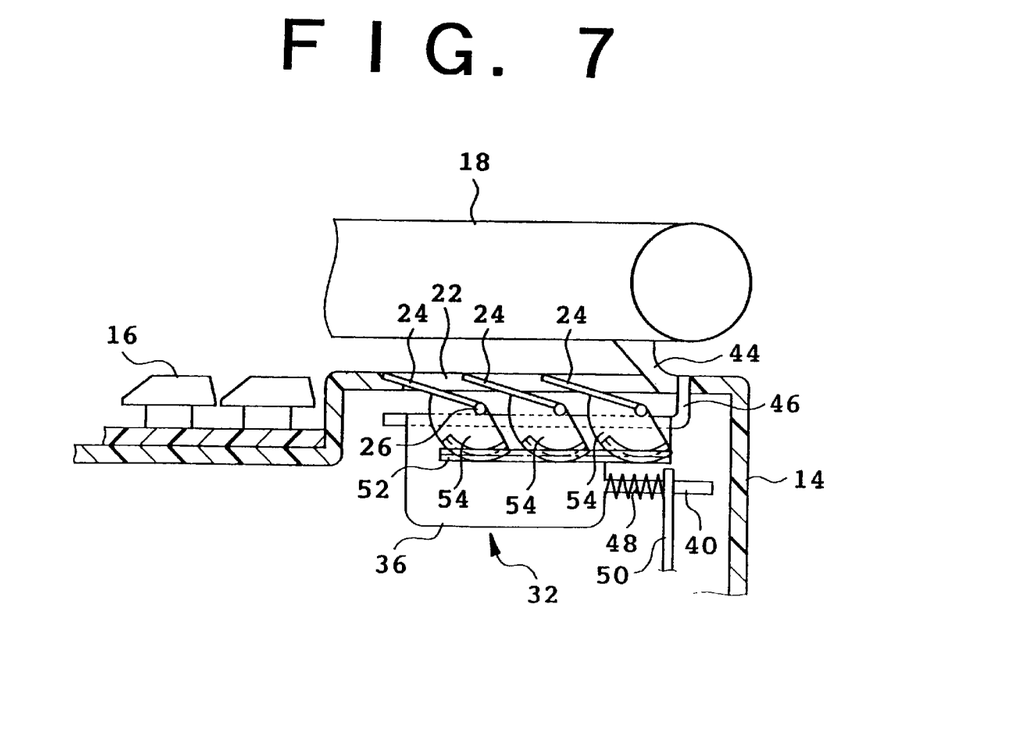
FIG. 7 is a sectional view of a second embodiment of the present invention in a condition wherein a display unit is closed.
Figure 8:
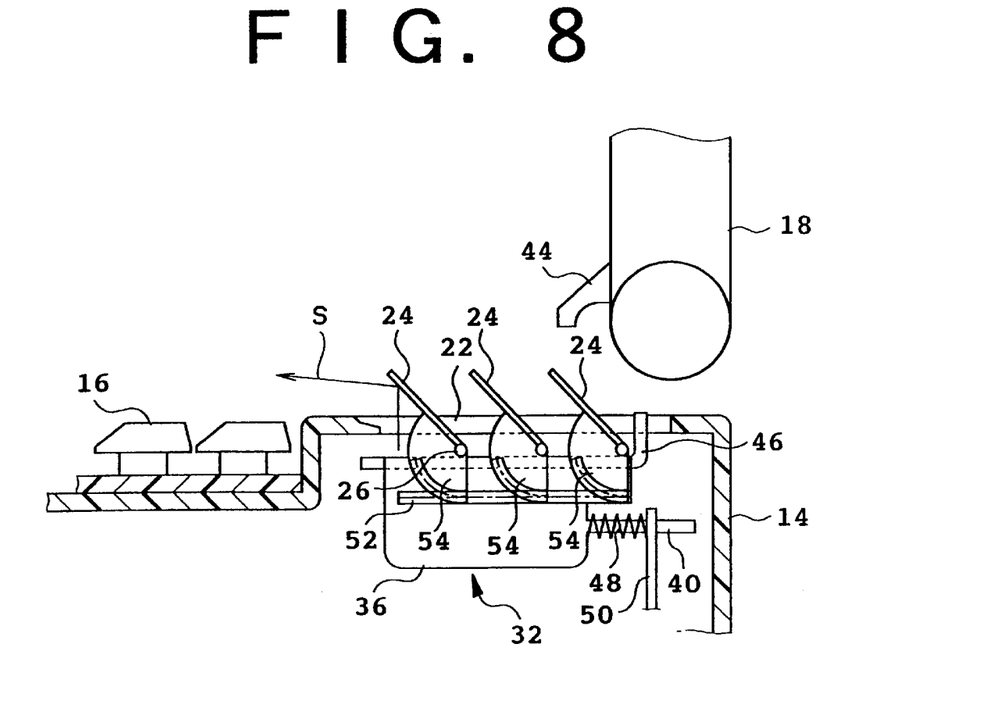
FIG. 8 sectional view of the second embodiment in another condition wherein the display unit is open.

Referring to FIGS. 7 and 8, there are shown sectional views of a second embodiment of the present invention. FIG. 7 shows a sectional view in a condition wherein the display unit 18 is closed while FIG. 8 shows another sectional view in another condition wherein the display unit 18 is open. The present embodiment is similar to the first embodiment described above, but is different from the first embodiment described above only in construction of motion conversion means for converting linear motion of a guide member 32 into pivotal motion of baffles 24. In particular, a rack 52 is secured to the guide member 32. Further, a pinion 54 which is held in meshing engagement with the rack 52 is secured to each of the baffles 24.

In a condition wherein the display unit 18 is closed on the body 14 as seen in FIG. 7, since the first engaging projections 44 are engaged with the second engaging projections 46, the guide member 32 is moved to its retracted position against the biasing force of the coil spring 48. Thereupon, also the rack 52 is moved to its retracted position. Since the pinions 54 are held in meshing engagement with the rack 52, when the rack 52 is moved to its retracted position, the pinions 54 are pivoted in the counterclockwise direction around the shafts 26. As a result, the baffles 24 are pivoted to the first position in which they substantially close up the opening 22.

When the display unit 18 is opened with respect to the body 14 as seen in FIG. 8, then since the engagement between the first engaging projection 44 and the corresponding second engaging projection 46 is lost, the guide member 32 is moved to its advanced position by the biasing force of the coil spring 48. Thereupon, also the rack 52 is moved to its advanced position. Since the pinions 54 are held in meshing engagement with the rack 52, they are rotated in the clockwise direction around the shafts 26 and the baffles 24 are pivoted to the second position in which they are inclined approximately by 45 degrees with respect to the top face of the body 14. In this state, sound from the speaker 8 is reflected forwardly by the baffles 24 as indicated by an arrow S in FIG. 8, and an operator of the personal computer can listen to sound having superior sound quality.

Figure 9:
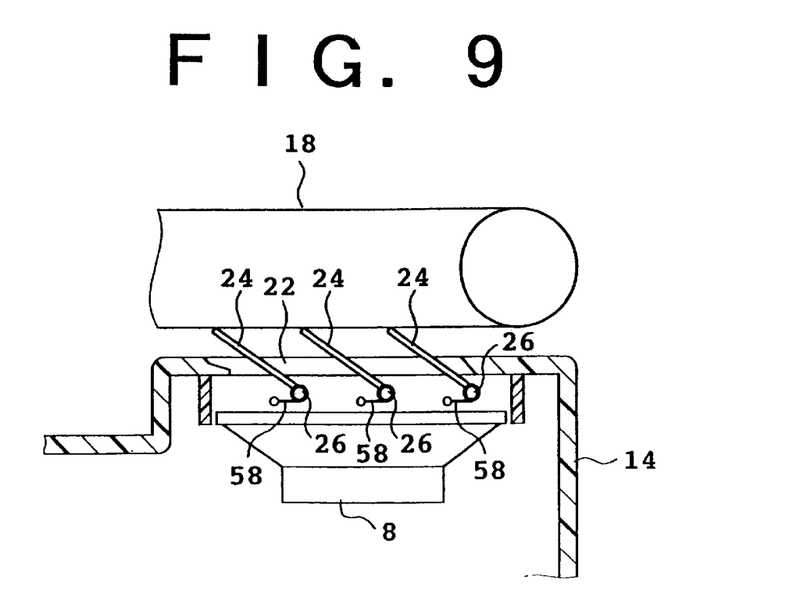
FIG. 9 is a sectional view of a third embodiment of the present invention in a condition wherein a display unit is closed.
Figure 10:
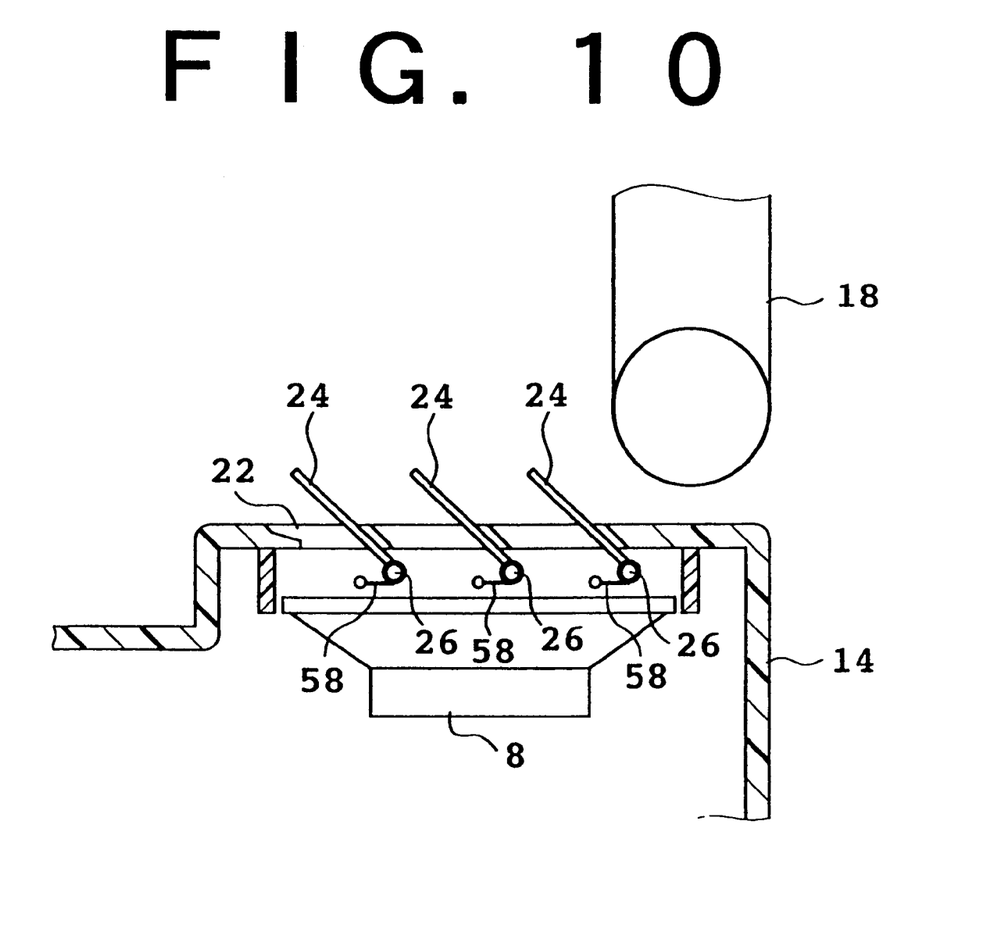
FIG. 10 is a sectional view of the third embodiment in another condition wherein the display unit is open.

Referring to FIGS. 9 and 10, there are shown sectional views of a third embodiment of the present invention. FIG. 9 shows a sectional view in a condition wherein the display unit 18 is closed and FIG. 10 shows another sectional view in another condition wherein the display unit 18 is open. In the present embodiment, a torsion spring 58 for biasing each baffle 24 in an opening direction is mounted on the shaft 26 of the baffle 24. Accordingly, in a condition wherein the display unit 18 is closed on the body 14, the baffles 24 are pivoted to their first position in which they substantially closed up openings 22 by the weight of the display unit 18.

In the condition wherein the display unit 18 is opened from the body 14 as seen in FIG. 10, since the shafts 26 are rotated in the clockwise direction by the biasing forces of the torsion springs 58, the baffles 24 are pivoted to their second position in which they are inclined approximately by 45 degrees with respect to the top face of the body 14. In this condition, since sound from the speaker 8 is reflected forwardly (leftwardly in FIG. 10) by the baffles 24, an operator of the notebook personal computer can listen to sound of high sound quality from which no sound component has been removed.

Since the present invention is constructed in such a manner as described in detail above, it exhibits an effect that a portable information processing apparatus which is improved in acoustic effect can be provided without sacrificing the compact configuration.

What is claimed is:

1. An information processing apparatus, comprising:
    a body having an opening at a top wall thereof;
    a display unit mounted for pivotal motion on said body;
    a speaker fixedly mounted in an upwardly directed condition in said body;
    an opening and closing member mounted for pivotal motion between a first position in which said opening and closing member substantially closes up said opening and a second position in which said opening and closing member is inclined by a predetermined angle with respect to said top wall of said body; and
    means operatively connected with said display unit for positioning said opening and closing member to the first position when said display unit is closed and positioning said opening and closing member to the second position when said display unit is opened.

2. An information processing apparatus, comprising:
    a body having an opening at a top wall thereof;
    a display unit mounted for pivotal motion on said body;
    a speaker fixedly mounted in an upwardly directed condition in said body;
    a baffle mounted for pivotal motion between a first position in which said baffle substantially closes up said opening and a second position in which said baffle is inclined by a predetermined angle with respect to said top wall of said body; and
    means operatively connected with said display unit for positioning said baffle to the first position when said display unit is closed and positioning said baffle to the second position when said display unit is opened.

3. A portable information processing apparatus, comprising:
    a body having an opening at a top wall thereof;
    a display unit mounted for pivotal motion on said body;
    a speaker fixedly mounted in an upwardly directed condition in said body below said opening;
    a baffle mounted in said opening for pivotal motion between a first position in which said baffle substantially closes up said opening and a second position in which said baffle is inclined by a predetermined angle with respect to said top wall of said body;
    a guide member mounted for linear movement between an advanced position and a retracted position in said body;
    biasing means for biasing said guide member to the advanced position;
    a first engaging projection secured to said display unit for engaging, when said display unit is closed on said body, with said guide member to move said guide member to the retracted position against a biasing force of said biasing means; and
    motion conversion means for converting linear motion of said guide member into pivotal motion of said baffle to move said baffle to the first position when said guide member is moved to the retracted position but moves said baffle to the second position when said guide member is moved to the advanced position.

4. A portable information processing apparatus according to claim 3, wherein said motion conversion means includes a flange secured to said baffle and having an elongated hole therein, and a pin secured to said guide member and inserted in said elongated hole.

5. A portable information processing apparatus according to claim 3, wherein said motion conversion means includes a rack secured to said guide member, and a pinion secured to said baffle and held in meshing engagement with said rack.

6. A portable information processing apparatus according to claim 3, wherein said guide member has a second engaging projection, and when said display unit is closed on said body, said first engaging projection is engaged with said second engaging projection to move said guide member to the retracted position against the biasing force of said biasing means.

7. A portable information processing apparatus according to claim 3, wherein said baffle includes a plurality of baffles mounted for pivotal motion in an aligned relationship with each other in said opening.

8. A portable information processing apparatus, comprising:
    a body having an opening at a top wall thereof;
    a display unit mounted for pivotal motion on said body;
    a speaker fixedly mounted in an upwardly directed condition in said body below said opening;
    a plurality of baffles mounted in said opening for pivotal motion between a first position in which said baffles substantially close up said opening and a second position in which said baffles are inclined by a predetermined angle with respect to said top wall of said body; and
    a plurality of torsion springs for individually normally biasing said baffles toward the respective second positions, each of said torsion springs being mounted on each pivot shaft of said respective baffles;

said baffles being pivoted, when said display unit is closed on said body, to the respective first positions against biasing forces of said torsion springs.

9. A portable information processing apparatus according to claim 8, wherein said biasing means are individually formed from torsion springs mounted on pivot shafts of said baffles.

10. A portable information processing apparatus, comprising:

a body having an opening at a top wall thereof;

a display unit mounted for pivot a speaker mounted in said body;

a speaker mounted in an upwardly directed condition in said body below said opening;

a baffle mounted in said opening for pivotal motion between a first position in which said baffle substantially closes up said opening and a second position in which said baffle is inclined by a predetermined angle with respect to said top wall of said body;

a guide member mounted for movement between an advanced position and a retracted position in said body;

biasing means for biasing said guide member to the advanced position;

a first engaging projection secured to said display unit for engaging, when said display unit is closed on said body, with said guide member to move said guide member to the retracted position against a biasing force of said biasing means; and motion conversion means for converting linear motion of said guide member into pivotal motion of said baffle to move said baffle to the first position when said guide member is moved to the retracted position but moves said baffle to the second position when said guide member is moved to the advanced position, wherein said motion conversion means includes a flange secured to said baffle and having an elongated hole therein, and a pin secured to said guide member and inserted in said elongated hole.

11. A portable information processing apparatus, comprising:

a body having an opening at a top wall thereof;

a display unit mounted for pivotal motion on said body;

a speaker mounted in an upwardly directed condition in said body below said opening;

a baffle mounted in said opening for pivotal motion between a first position in which said baffle substantially closes up said opening and a second position in which said baffle is inclined by a predetermined angle with respect to said top wall of said body;

a guide member mounted for movement between an advanced position and a retracted position in said body;

biasing means for biasing said guide member to the advanced position;

a first engaging projection secured to said display unit for engaging, when said display unit is closed on said body, with said guide member to move said guide member to the retracted position against a biasing force of said biasing means; and motion conversion means for converting linear motion of said guide member into pivotal motion of said baffle to move said baffle to the first position when said guide member is moved to the retracted position but moves said baffle to the second position when said guide member is moved to the advanced position, wherein said motion conversion means includes a rack secured to said guide member, and a pinion secured to said baffle and held in meshing engagement with said rack.

12. A portable information processing apparatus, comprising:

a body having an opening at a top wall thereof;

a display unit mounted for pivotal motion on said body;

a speaker mounted in an upwardly directed condition in said body below said opening;

a baffle mounted in said opening for pivotal motion between a first position in which said baffle substantially closes up said opening and a second position in which said baffle is inclined by a predetermined angle with respect to said top wall of said body;

a guide member mounted for movement between an advanced position and a retracted position in said body;

biasing means for biasing said guide member to the advanced position;

a first engaging projection secured to said display unit for engaging, when said display unit is closed on said body, with said guide member to move said guide member to the retracted position against a biasing force of said biasing means; and motion conversion means for converting linear motion of said guide member into pivotal motion of said baffle to move said baffle to the first position when said guide member is moved to the retracted position but moves said baffle to the second position when said guide member is moved to the advanced position, wherein said guide member has a second engaging projection, and when said display unit is closed on said body, said first engaging projection is engaged with said second engaging projection to move said guide member to the retracted position against the biasing force of said biasing means.

13. An apparatus for improving sound from a speaker by using a case, the case capable of being in an open position and a closed position, comprising:

rotating fins mounted over the speaker, the rotating fins capable of being in an inclined position and a shut position; and a coupling device connecting the fins to the case, wherein when the case is placed in the open position the coupling device rotates the fins to the inclined position, and when the case is placed in the closed position the coupling device rotates the fins to the shut position.

14. The apparatus as recited in claim 13, wherein the coupling device comprises a flange secured to a fin and having an elongated hole therein, and a pin secured to a guide member and inserted in said elongated hole.

15. The apparatus as recited in claim 13, wherein the coupling device comprises a rack secured to a guide member, and a pinion secured to a fin and held in meshing engagement with said rack.

16. The apparatus as recited in claim 13, wherein the coupling device comprises a plurality of torsion springs for individually normally biasing the fins toward the inclined position, each of the torsion springs being mounted on a pivot shaft of each fin.

17. The apparatus as recited in claim 13, wherein the coupling device comprises a spring.

18. The apparatus as recited in claim 13, wherein the coupling device comprises a guide member.

* * * * *

UNITED STATES PATENT AND TRADEMARK OFFICE
CERTIFICATE OF CORRECTION

PATENT NO.:     6,067,224
DATED    :      May 23, 2000
INVENTOR(S):    Atsunobu NOBUCHI

It is certified that errors appear in the above-identified patent and that said Letters Patent is hereby corrected as shown below:

Col. 7, line 11, after "mounted for" change "pivot" to --pivotal motion on said body--.

Col. 7, line 12, delete "a speaker mounted in said body;".

Signed and Sealed this

Twentieth Day of March, 2001

*Attest:*

NICHOLAS P. GODICI

*Attesting Officer*     Acting Director of the United States Patent and Trademark Office